United States Patent

Moretti

[11] 3,967,097
[45] June 29, 1976

[54] VEHICLE FUEL ECONOMY CALCULATOR AND INDICATOR

[75] Inventor: John A. Moretti, Kokomo, Ind.
[73] Assignee: General Motors Corporation, Detroit, Mich.
[22] Filed: Sept. 15, 1975
[21] Appl. No.: 613,081

[52] U.S. Cl. .................. 235/150.21; 235/92 FL; 235/61 J; 73/114
[51] Int. Cl.² .................................. G01M 15/00
[58] Field of Search ....... 235/151.34, 151.3, 150.21, 235/92 MT, 92 FL, 92 CP, 61 J, 152; 73/113, 114

[56] References Cited
UNITED STATES PATENTS

| | | | |
|---|---|---|---|
| 2,282,438 | 5/1942 | Thompson | 235/150.21 |
| 3,549,868 | 12/1970 | Watson et al. | 235/92 |
| 3,793,882 | 2/1974 | Holben | 73/113 |
| 3,927,305 | 12/1975 | Gruhl | 235/150.21 |

Primary Examiner—Edward J. Wise
Attorney, Agent, or Firm—Howard N. Conkey

[57] ABSTRACT

A vehicle fuel economy calculator including a digital circuit for generating a first series of pulse groups with the number of pulses in each group representing a calculation of instantaneous vehicle fuel economy. A digital averaging circuit generates a second series of pulse groups with the number of pulses in each group representing an average vehicle fuel economy determined by the average number of pulses in each pulse group in a predetermined number of consecutive pulse groups in the first series. A gating and indicating circuit is responsive to the vehicle speed and fuel consumption rate for providing an indication of zero fuel economy when the vehicle speed is below a predetermined speed, for coupling the first series of pulse groups to the indicator during a specified period of time after the vehicle reaches the predetermined speed or when the fuel consumption exceeds a predetermined rate, and for coupling the second series of pulse groups to the indicator circuit at all other times.

3 Claims, 4 Drawing Figures

VEHICLE FUEL ECONOMY CALCULATOR AND INDICATOR

This invention relates to a fuel economy calculator and indicator. More specifically, this invention relates to a digital circuit for calculating and selectively providing an indication of the instantaneous vehicle fuel economy or the average fuel economy as a function of vehicle speed and fuel consumption rate.

Vehicle fuel economy calculators and indicators are generally known wherein analog signals are utilized to perform the calculation of vehicle distance travelled per unit of fuel and to drive a meter to provide an indication of the vehicle fuel economy. In addition, digital vehicle fuel economy calculators and indicators are known for providing a digital indication of vehicle fuel economy.

Generally, the digital systems provide for a fuel consumption pulse generator wherein a series of pulses are generated having a frequency directly proportional to vehicle fuel consumption and further provide a digital speed pulse generator for providing a series of pulses having a frequency directly related to vehicle speed. These systems provide for the counting of the number of speed pulses between fuel pulses to provide a digital indication of vehicle distance travelled per unit of fuel use. In this type of digital system, the repetition rate of the calculation of vehicle fuel economy varies as a function of the magnitude of the fuel consumption rate as the speed pulses are counted over a period of time required to consume a specific quantity of fuel.

It is the general object of this invention to provide an improved digital vehicle fuel economy calculator and indicator.

It is another object of this invention to provide an improved vehicle fuel economy calculator and indicator wherein the period of calculation is independent of the vehicle fuel consumption rate.

It is another object of this invention to provide an improved digital vehicle fuel economy calculator which generates a first digital signal representing the instantaneous vehicle fuel economy and a second digital signal representing an average vehicle fuel economy.

It is another object of this invention to provide an improved digital fuel economy calculator wherein series of pulse groups are generated with the number of pulses in each group being representative of a calculation of vehicle fuel economy.

These and other objects of this invention may be best understood by reference to the following description of a preferred embodiment and the drawings in which:

In the following description of the preferred embodiment, the terms logic 1 and logic 0 are digital states wherein a logic 1 is a positive voltage level and a logic 0 is ground or reference potential.

Figure 1:
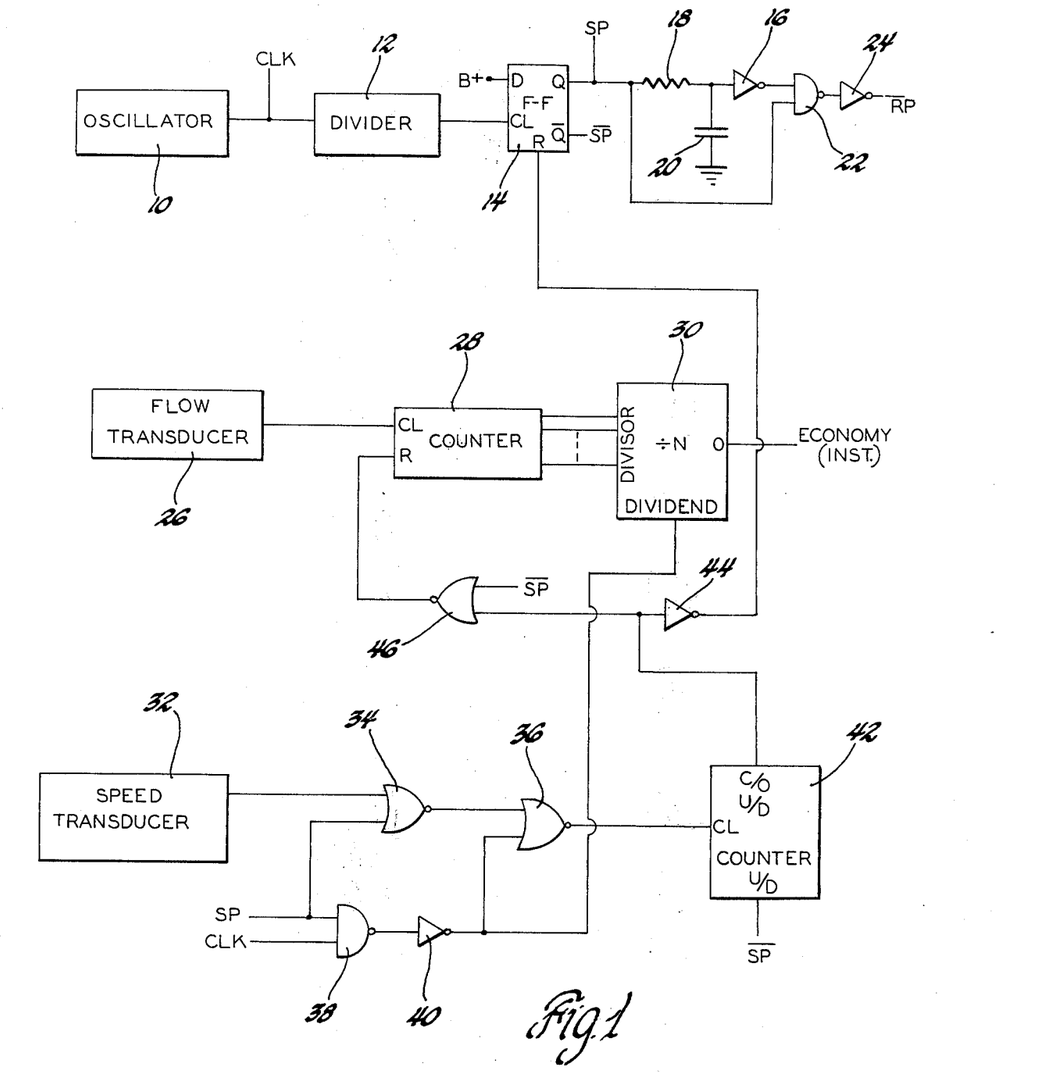
FIG. 1 is a diagram of the digital circuit for calculating the instantaneous vehicle fuel economy.
Figure 4:
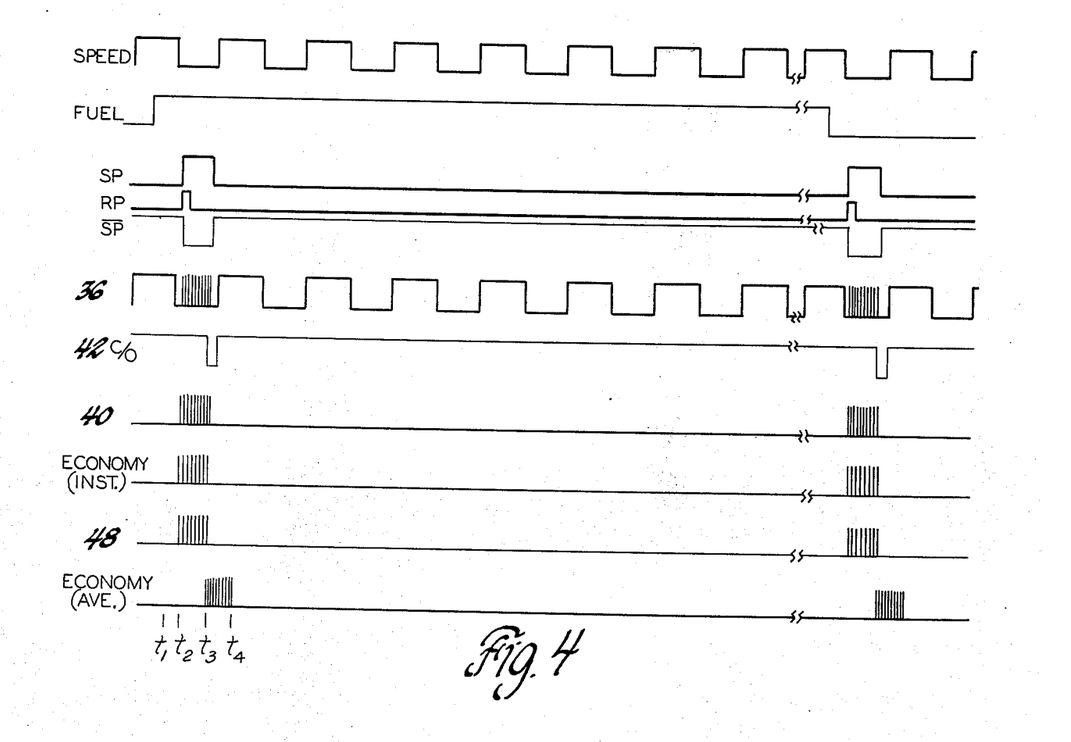
FIG. 4 is a timing logic diagram for the vehicle fuel economy calculator and indicator of this invention.

Referring to FIGS. 1 and 4, an oscillator 10 generates a series of high frequency clock pulses CLK which are coupled to a divider 12. The divider 12 divides the frequency of the clock pulses CLK down to a low frequency square-wave signal coupled to the clock input of a flip-flop 14. The data input of the flip-flop 14 is coupled to a DC voltage source B+ representing a logic 1 which may be, for example, the vehicle battery.

The flip-flop 14 operates to transfer the logic signal at the data input thereof to its Q output upon a transition of the clock input from logic 0 to logic 1. The Q output of the flip-flop 14 comprises a sample pulse logic signal SP and the $\overline{Q}$ output of the flip-flop 14 comprises the inverse sample pulse $\overline{SP}$. The sample pulse SP is a logic 0 pulse which is terminated when the output of the divider 12 shifts from logic 0 to logic 1 to clock the flip-flop 14 and shift the Q output thereof to a logic 1.

The sample pulse SP is coupled to the input of an INVERTER 16 through a time delay circuit comprised of a resistor 18 and a capacitor 20, the capacitor 20 being coupled between the input of the INVERTER 16 and a logic 0 reference point. The output of the INVERTER 16 is coupled to one input of a NAND gate 22 whose output is coupled to an INVERTER 24. The sample pulse SP is also coupled to a second input of the NAND gate 22. At the termination of each sample pulse SP (the sample pulse SP shifting from a logic 0 to a logic 1), the output of the INVERTER 24 momentarily supplies a logic 1 reset pulse RP having a duration determined by the time constant of the resistor 18 and capacitor 20.

A flow transducer 26 is responsive to vehicle fuel consumption for generating a series of logic 1 pulses having a repetition rate directly related to vehicle fuel consumption rate. The fuel flow pulses from the flow transducer 26 are coupled to the clock input of a counter 28. The digital output of the counter 28 is coupled in parallel fashion to the divisor input of a programmable divide-by-N counter 30. The digital output of the counter 28 represents a quantity of fuel consumed by the vehicle.

A speed transducer 32 is responsive to vehicle speed for generating a series of logic 1 pulses having a repetition rate directly related to vehicle speed. The speed transducer 32 and flow transducer 26 are scaled so that a pulse output from each represents the same fraction of a unit of distance and fuel consumption, respectively. The speed pulses from the speed transducer 32 are coupled to one input of a NOR gate 34 whose output is coupled to one input of a NOR gate 36. The sample pulse SP is coupled to a second input of the NOR gate 34 and to one input of a NAND gate 38. The clock pulses from the oscillator 10 are coupled to a second input of the NAND gate 38 whose output is coupled to an INVERTER 40. The output of the INVERTER 40 is in turn coupled to a second input of the NOR gate 36 and to the dividend input of the divide-by-N counter 30. The output of the NOR gate 36 is coupled to the clock input of an up/down counter 42. The inverse sample pulse $\overline{SP}$ is coupled to the up/down control input of the up/down counter 42.

The counter 42 is counted up by pulses applied to the clock input thereof when the inverse sample pulse $\overline{SP}$ is a logic 1 and is counted down by pulses applied to the clock input thereof when the inverse sample pulse $\overline{SP}$ is a logic 0.

The NOR gates 34 and 36, the NAND gate 38 and the INVERTER 40 are responsive to the speed pulses from the speed transducer 32, the clock pulses CLK and the sample pulse SP to supply pulses to the clock input of the up/down counter 42 at the repetition rate of the speed pulses during the sample pulse SP and supply pulses to the clock input of the up/down counter 42 and to the dividend input of the divide-by-N counter 30 at the repetition rate of the clock pulses CLK between sample pulses SP. As the inverse sample pulse $\overline{SP}$ is a logic 1 during the sample pulse SP and is a logic 0 between sample pulses, the up/down counter 42 is counted up by the pulses coupled to its clock input during the sample pulse $\overline{SP}$ and counted down by the pulses coupled to its clock input between sample pulses SP. The number of pulses coupled to the clock input of the up/down counter 42 during a sample pulse SP is equal to the number speed pulses generated during the same sample pulse SP and represents the distance traveled by the vehicle during the period of the sample pulse SP.

The up/down counter 42 has a carry-out output C/O which is normally at a logic 1 and which momentarily shifts to a logic 0 when the up/down counter 42 is counted down to zero.

The carry-out output of the up/down counter 42 is coupled to the reset input of the flip-flop 14 through an INVERTER 44 and to one input of a NOR gate 46. The inverse sample pulse $\overline{SP}$ is coupled to a second input of the NOR gate 46 whose output is coupled to the reset input of the counter 28.

When the up/down counter 42 is counted down to zero, the resulting momentary transition of the carry-out output from logic 1 to logic 0 causes the output of the INVERTER 44 to shift from a logic 0 to a logic 1 to reset the flip-flop 14 to initiate a sample pulse SP. Simultaneously, the transition of the carry-out output of the up/down counter 42 from logic 1 to logic 0 while the inverse sample pulse $\overline{SP}$ is a logic 0 results in the output of the NOR gate 46 shifting to a logic 1 to reset the counter 28.

The number of pulses applied to the dividend input of the divide-by-N counter 30 from the INVERTER 40 between sample pulses SP is divided by the digital number applied to the divisor input thereof from the counter 28. The divide-by-N counter 30 supplies a number of pulses at its output equal to the quotient.

The operation of the digital circuit of FIG. 1 will be described beginning in time at the leading edge of the sample pulse SP. At this time, the counter 28 is reset and the up/down counter 42 is at a count of zero. Also, the inverse sample pulse $\overline{SP}$ shifts to a logic 1 to plate the up/down counter 42 in its count-up mode.

During the period of the sample pulse SP, the up/down counter 42 is clocked at the repetition rate of the speed pulses and counts up by the number of pulses applied thereto, which number is equal to the number of speed pulses occurring during the period of the sample pulse SP. The number of speed pulses counted represents distance travelled. At the same time, the fuel flow pulses from the flow transducer 26 clock the counter 28 which counts the number of fuel flow pulses. The total number of fuel flow pulses counted during the sample pulse SP represent the quantity of fuel used during the period of the sample pulse SP.

When the output of the divider 12 clocks the flip-flop 14 to terminate the sample pulse, the inverse sample pulse $\overline{SP}$ shifts to a logic 0 to place the up/down counter 42 in its count-down mode. Simultaneously, the up/down counter 42 is clocked at the repetition rate of the clock pulses CLK and counts down from the number representing distance travelled during the previous sample pulse SP. The up/down counter 42 is counted down in rapid fashion by the high frequency pulses applied to its clock input until it is counted down to zero at which time the carry-out output thereof momentarily shifts from a logic 1 to a logic 0 to reset the flip-flop 14 to initiate a new sample pulse SP and reset the counter 28.

The total number of high frequency pulses coupled to the clock input of the up/down counter 42 between the sample pulses SP is therefore exactly equal to the number of speed pulses counted during the previous sample pulse SP. This sample number of pulses representing distance travelled during the previous sample pulse SP is applied to the dividend input of the divide-by-N counter 30. As the output of the counter 28 between sample pulses SP is equal to the number of flow pulses during the previous sample pulse and therefore fuel consumed during the previous sample pulse, the divide-by-N counter supplies a number of pulses equal to the number of speed pulses counted by the up/down counter during the previous sample pulse SP divided by the number of flow pulses counted by the counter 28 during the same previous sample pulse SP. Consequently, the output of the divide-by-N counter 30 is a pulse group containing a number of pulses which represents the instantaneous vehicle fuel economy in terms of distance travelled per unit of fuel consumption.

Upon initiation of a new sample pulse SP, the up/down counter again counts up at the rate of the speed pulses from the speed transducer 32 and the counter 28 counts the flow pulses supplied by the flow transducer 26. This cycle is continuously repeated resulting in a series of pulse groups at the output of the divide-by-N counter 30, each of which contains a number of pulses representing the instantaneous vehicle fuel economy.

Figure 2:
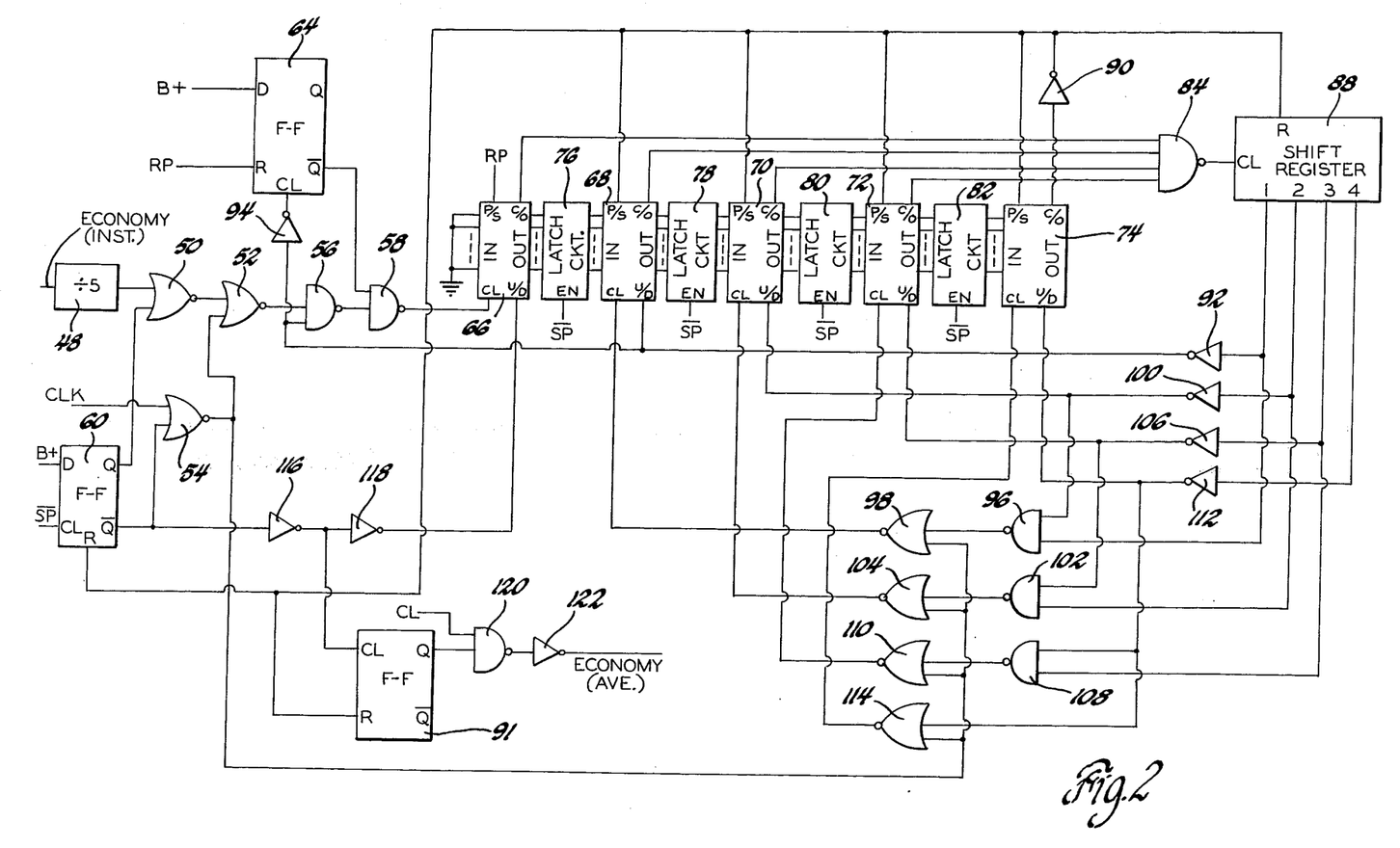
FIG. 2 is a diagram of the digital circuit for calculating the average vehicle fuel economy.

Referring to FIG. 2, there is illustrated a digital circuit for providing an output representing the average vehicle fuel economy. In the preferred embodiment, the average vehicle fuel economy is determined by the five most recent calculations of instantaneous vehicle fuel economy as represented by the output of the divide-by-N counter 30 of FIG. 1 for illustration purposes only. It is understood that the average vehicle fuel economy can be calculated from any desired number of the most recent calculations of instantaneous vehicle fuel economy.

The series of pulse groups representing instantaneous vehicle fuel economy from the divide-by-N counter 30 of FIG. 1 is coupled to the input of a divide-by-five counter 48. The output of the divide-by-five counter 48 is a series of high frequency pulse groups, each group containing a number of pulses representing the instantaneous vehicle fuel economy divided by five.

The output of the divide-by-five counter 48 is coupled to one input of a NOR gate 50 whose output is coupled to one input of a NOR gate 52. The clock signal CLK from the oscillator 10 of FIG. 1 is coupled to one input of a NOR gate 54 whose output is coupled to a second input of the NOR gate 52. The output of the NOR gate 52 is coupled to one input of a NAND gate 56 whose output is coupled to one input of a NAND gate 58.

The inverse sample pulse $\overline{SP}$ is coupled to the clock input of a flip-flop 60. The DC voltage source B+ representing a digital logic 1 is coupled to the data input of the flip-flop 60. The Q output of the flip-flop 60 is coupled to a second input of the NOR gate 50 and the $\overline{Q}$ output thereof is coupled to a second input of the NOR gate 54.

The reset pulse RP is coupled to the reset input of a flip-flop 64 having the DC voltage source B+ representing a logic 1 applied to the data input thereof. The $\overline{Q}$ output of the flip-flop 64 is coupled to a second input of the NAND gate 58.

A number of presettable up/down counters 66, 68, 70, 72, and 74 are provided, the number of presettable up/down counters 66 through 74 being equal to the number (5) by which the divider 48 divides the instantaneous vehicle fuel economy input thereto. Each of the presettable up/down counters 66 through 74 has parallel data jam inputs and parallel data outputs. A positive voltage at the preset inputs P/S of the presettable up/down counters 66 through 74 functions to preset the respective up/down counter to the logic states at the data inputs thereof.

A number of latch circuits 76, 78, 80, and 82 equal to one less than the number of the presettable up/down counters 66 through 74 are provided each of which is coupled between the data outputs and the data jam inputs of a respective pair of up/down counters 66 through 74, as illustrated, to form a series of up/down counters interconnected by the latch circuits 76 through 82. For example, the inputs to the latch circuit 76 are coupled to the data outputs of the up/down counter 66 and the outputs of the latch circuit 76 are coupled to the data inputs of the up/down counter 68. The data inputs of the presettable up/down counter 66 are coupled to logic 0 reference and the data outputs of the up/down counter 74 are uncoupled. Each one of the latch circuits 76 through 82 functions as a memory device whose outputs are set and latched to the logic states of the data outputs of the up/down counter coupled therewith when the logic state at its enable input shifts from a logic 0 to a logic 1. The latch circuits 76 through 82 are controlled by the inverse sample pulse $\overline{SP}$ coupled to their enable inputs.

The carry-out outputs C/O of each of the up/down counters 66 through 72 are coupled to respective inputs of a NAND gate 84 whose output is coupled to the clock input of a shift register 88. The carry-out output of the last up/down counter 74 is coupled to the input of an INVERTER 90 whose output is coupled to the reset input of the shift register 88, the preset inputs P/S of the up/down counters 68, 70, 72, and 74, the reset input of the flip-flop 60 and the reset input of a flip-flop 91. The reset pulse RP from the NAND gate 24 of FIG. 1 is coupled to the preset input of the up/down counter 66.

The output of the first stage of the shift register 88 is coupled to the input of an INVERTER 92 whose output is coupled to the up/down control input U/D of the up/down counter 68, to a second input of the NAND gate 56 and to the clock input of the flip-flop 64 through an INVERTER 94. The output of the first stage of the shift register 88 is further coupled to one input of a NAND gate 96 whose output is coupled to one input of a NOR gate 98. The output of the NOR gate 98 is coupled to the clock input of the up/down counter 68.

The output of the second stage of the shift register 88 is coupled to the input of an INVERTER 100 whose output is coupled to a second input of the NAND gate 96 and to the up/down control input of the up/down counter 70. The output of the second stage of the shift register 88 is further coupled to one input of a NAND gate 102 whose output is coupled to one input of a NOR gate 104. The output of the NOR gate 104 is coupled to the clock input of the up/down counter 70.

The output of the third stage of the shift register 88 is coupled to the input of an INVERTER 106 whose output is coupled to a second input of the NAND gate 102 and to the up/down control input of the up/down counter 72. The output of the third stage of the shift register 88 is fruther coupled to one input of a NAND gate 108 whose output is coupled to one input of a NOR gate 110. The output of the NOR gate 110 is coupled to the clock input of the up/down counter 72. The output of the fourth stage of the shift register 88 is coupled to the input of an INVERTER 112 whose output is coupled to a second input of the NAND gate 108, to one input of a NOR gate 114 and to the up/down control input of the up/down counter 74. The output of the NOR gate 114 is coupled to the clock input of the up/down counter 74. The output of the NOR gate 54 is coupled to respective inputs of each of the NOR gates 98, 104, 110 and 114.

The $\overline{Q}$ output of the flip-flop 60 is coupled to the input of an INVERTER 116 whose output is coupled to the input of an INVERTER 118 and to the clock input of the flip-flop 91. The output of the INVERTER 118 is coupled to the up/down control input of the up/down counter 66. The Q output of the flip-flop 91 is coupled to one input of a NAND gate 120 whose output is coupled to the input of an INVERTER 122. The clock signal CLK is coupled to a second input of the NAND gate 120.

The operation of the circuit of FIG. 2 will be described beginning at time $t_1$ in FIG. 4 just prior to the end of the sample pulse SP. At this time, the flip-flops 60 and 91 and the shift register 88 are reset. Therefore, the output of the NOR gate 54 at a logic 0, the input to the up/down control input of the up/down register 66 is a logic 1 to set the up/down counter 66 in its count-up mode, the output of the NAND gate 120 is at a logic 1 to maintain the output of the INVERTER 122 at a logic 0, the input to the NAND gate 58 from the flip-flop 64 is a logic 0 and the input to the NAND gate 56 from the inverter 92 is a logic 1.

At the termination of the sample pulse SP at time $t_2$, the reset pulse RP is generated at the output of the INVERTER 24 of FIG. 1 to reset the flip-flop 64, which then supplies a logic 1 to the NAND gate 58, and to preset the up/down counter 66 to the logic 0's applied to the data inputs.

Immediately after termination of the sample pulse SP, the circuit of FIG. 1 supplies a pulse group, containing a number of pulses which represents the instantaneous vehicle fuel economy. The pulses are applied to the divide-by-five counter 48 whose output is a pulse group containing a number of pulses which represents the instantaneous vehicle fuel economy divided by five. With their respective inputs, the NOR gates 50, 52, and 54 and the NAND gates 56 and 58 function to supply pulses to the clock input of the up/down counter 66 at the same rate as and coincident with the pulse output from the divider 48. The up/down counter 66 counts up the number of pulses supplied thereto (the input to its up/down control input from the inverter 118 being a logic 1).

At the end of the pulse group coupled to the divide-by-five counter 48, at time $t_3$, the up/down counter 66 has been counted up to a digital number representing the most recent calculation of vehicle fuel economy divided by five. At time $t_3$ the sample pulse SP is again initiated, as previously described, and the inverse sample pulse $\overline{SP}$ shifts from logic 0 to logic 1. Upon the transition of the inverse sample pulse $\overline{SP}$ from logic 0, to logic 1, the flip-flop 60 is clocked and the latch circuits 76, 78, 80 and 92 are enabled to memorize the data outputs of the respective up/down counters 66, 68, 70, and 72 coupled thereto. The memorized data outputs are coupled to the respective data inputs of the flip-flops 68, 70, 72, and 74 coupled therewith.

Upon clocking of the flip-flop 60, the Q output thereof shifts to a logic 1 to shift the output of the NOR gate 50 to a continuous logic 0. Simultaneously, the $\overline{Q}$ output of the flip-flop 60 shifts to a logic 0 resulting in the output of the INVERTER 116 shifting to a logic 1 to clock the flip-flop 91 and resulting in the output of the inverter 118 shifting to a logic 0 to set the up/down counter 66 in its countdown mode.

Upon clocking of the flip-flop 91 at time $t_3$, the Q output thereof shifts from a logic 0 to a logic 1 to enable the NAND gate 120 and the INVERTER 122 to supply pulses at the same repetition rate as the clock pusles CLK and coincident therewith. Simultaneously, with their respective inputs, the NOR gates 50, 52, and 54 and the NAND gates 56 and 58 function to supply pulses to the clock input of the up/down counter 66 at the same rate and coincident with the clock pulses CLK. The up/down counter 66 is counted down by the pulses supplied thereto to zero at which time the carry-out output thereof momentarily shifts from logic 1 to logic 0. The momentary logic 0 pulse from the carry-out output of the up/down counter 66 causes the NAND gate 84 to momentarily shifts its output from a logic 0 to a logic 1 to clock the shift register 88, the first stage output of which shifts to a logic 1. The output of the INVERTER 92 then shifts from logic 1 to logic 0 to set the up/down counter 68 in its count-down mode and to inhibit the NAND gate 56 whose output is maintained at a logic 1. The logic 0 output from the INVERTER 92 shifts the output of the INVERTER 94 to a logic 1 to clock the flip-flop 64 whose $\overline{Q}$ output shifts to a logic 0 which inhibits the NAND gate 58 to prevent additional pulses from being coupled to the clock input of the up/down counter 66. The logic 1 output of the first stage of the shift register 88 further causes the output of the NAND gate 96 to shift to a logic 0. The NOR gates 54 and 98 are then enabled to supply pulses to the clock input of the up/down counter 68 at the same rate and coincident with the clock pulses CLK.

The up/down counter 68 is then counted down to zero by the pulses supplied thereto at which time its carry-out output shifts momentarily to a logic 0 to cause the output of the NAND gate 84 to once again momentarily shift to a logic 1. The logic 1 pulse from the NAND gate 84 clocks the shift register 88 whose first output shifts to a logic 0 and whose second output shifts to a logic 1. The resulting logic 0 output of the INVERTER 100 places the up/down counter 70 in its count-down mode. Further, the logic 0 output of the first stage of the shift register 88 shifts the output of the NAND gate 96 to a logic 1 to inhibit further pulses from being coupled to the clock input of the up/down counter 68. The logic 1 input to the NAND gate 102 from the inverter 106 and the logic 1 input to the NAND gate 102 from the second stage of the shift register 88 results in its output shifting to a logic 0. The NOR gates 54 and 104 are then enabled to supply pulses to the clock input of the up/down counter 70 at the same rate and coincident with the clock pulses CLK.

The up/down counter 70 is counted down to zero by the pulses supplied thereto at which time carry-out output thereof momentarily shifts to a logic 0 to cause the NAND gate 84 to supply a logic 1 pulse to clock the shift register 88 whose second output shifts to a logic 0 and whose third output shifts to a logic 1. The resulting logic 0 output of the INVERTER 106 places the up/down counter 72 in its countdown mode. Further, the logic 0 output of the second stage of the shift register 88 shifts the output of the NAND gate 102 to a logic 1 to inhibit further pulses from being coupled to the clock input of the up/down count 70. The logic 1 input to the NAND gate 108 from the INVERTER 112 and the logic 1 input to the NAND gate 108 from the third stage of the shift register 88 results in its output shifting to a logic 0. The NOR gates 54 and 100 are then enabled to supply pulses to the clock input of the up/down counter 72 at the same rate and coincident with the clock pulses CLK.

The up/down counter 72 is counted down to zero by the pulses supplied thereto at which time the carry-out output thereof momentarily shifts to a logic 0 to cause the NAND gate 84 to supply a logic 1 pulse to clock the shift register 88 whose third output shifts to a logic 0 and whose fourth output shifts to a logic 1. The resulting logic 0 output of the INVERTER 112 places the up/down counter 74 in its count-down mode. Further, the logic 0 output of the third stage of the shift register 88 shifts the output of the NAND gate 108 to a logic 1 to inhibit further pulses from being coupled to the clock input of the up/down counter 72. The logic 0 output from the INVERTER 112 enables NOR gates 54 and 114 to supply pulses to the clock input of the up/down counter 74 at the same rate and coincident with the clock pulses CLK.

The up/down counter 74 is counted down to zero by the pulses supplied thereto at which time the carry-out output thereof momentarily shifts to a logic 0 at time $t_4$. The resulting logic 1 pulse output from the INVERTER 90 resets the shift register 88, resets the flip-flops 60 and 91 and presets the up/down counters 68, 70, 72, and 74 to the digital number supplied thereto from the respective latch circuits 76, 78, 80, and 82. At this time, the digital number previously in the up/down counter 66 is placed in the up/down counter 68. Similarly, each of the up/down counters 70, 72, and 74 are preset to the digital number previously in the up/down counters 68, 70, and 72, respectively. Upon the resetting of the flip-flop 91 the Q output thereof is shifted to a logic 0 to inhibit the NAND gate 120 and INVERTER 122 from supplying additional pulses. Consequently, the NAND gate 120 and the INVERTER 122 were enabled to supply pulses at the output of the INVERTER 122 only during the time period that pulses were supplied to count down each of the up/down counters 66 to 74 in sequence. As the pulses supplied at the output of INVERTER 122 were at the same repetition rate as and coincident with the pulses supplied to count down the up/down counters 66 through 74, the total number of pulses supplied at the output of the INVERTER 122 was equal to the sum of the digital numbers in each of the up/down counters 66 through 74 prior to their being counted down.

The resetting of the flip-flop 60 at time $t_4$ resulted in the shifting of its $\overline{Q}$ output to a logic 1 which caused the output of the INVERTER 118 to shift to a logic 1 to return the up/down counter 66 to its count-up mode. At this time, the circuit of FIG. 2 is again at its initial state and the cycle described is again repeated at the next termination of the sample pulse SP.

As can be seen, the input to the up/down counter 66 representing the most recent calculation of vehicle fuel economy divided by five is shifted through each of the up/down counters 68, 70, 72, and 74 in sequence until it is counted down in the up/down counter 74. Therefore, each of the digital numbers in each of the up/-down counters 66 through 74 represents one-fifth of a respective one of the previous five calculations of instantaneous vehicle fuel economy and the total number of pulses supplied at the output of the INVERTER 122 each time the up/down counters 66 through 74 are counted down in sequence represents the average vehicle fuel economy as determined by the average of the most recent five calculations of instantaneous vehicle fuel economy. The output of the INVERTER 122 in FIG. 2 is therefore a series of pulse groups, each pulse group containing a number of pulses representing the average vehicle fuel economy determined by the five most recent calculations of the instantaneous vehicle fuel economy.

Figure 3:
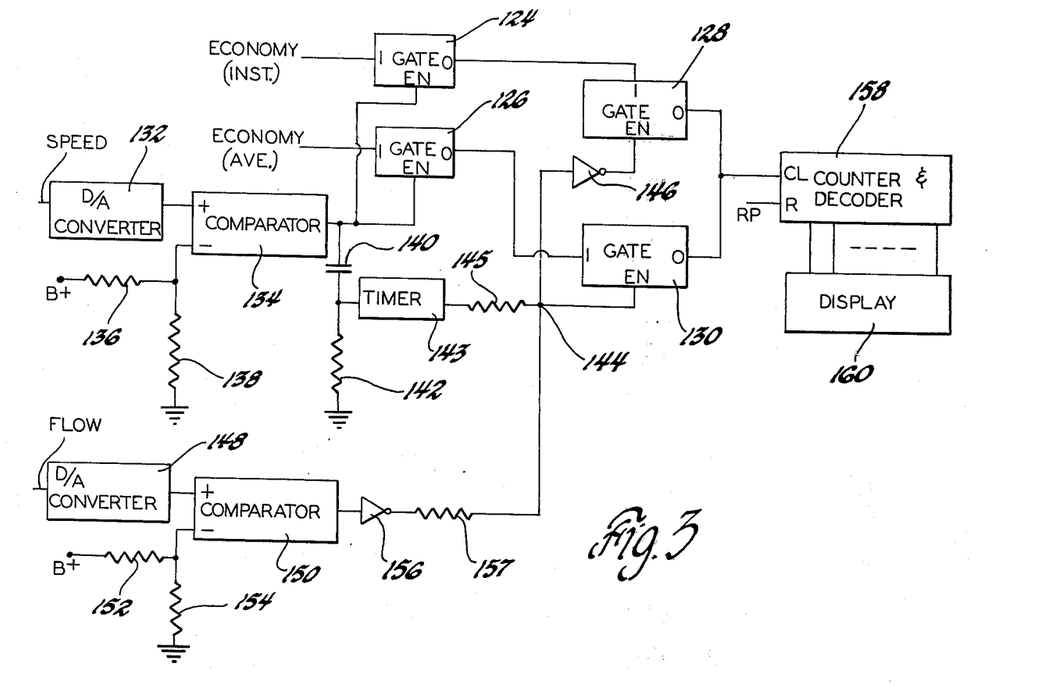
FIG. 3 is a diagram of the digital circuit for selectively coupling the instantaneous and average vehicle fuel economy to a digital display.

Referring to FIG. 3, the series of pulse groups representing the instantaneous vehicle fuel economy is coupled to the input of a gate 124 and the series of pulse groups representing the average vehicle fuel economy is coupled to the input of a gate 126. The output of the gate 124 is coupled to the input of a gate 128 and the output of the gate 126 is coupled to the input of a gate 130.

The output of the speed transducer 32 of FIG. 1 is coupled to the input of a digital-to-analog converter 132 whose output is a DC voltage directly proportional to vehicle speed. This output is coupled to the positive input of a comparator 134. A voltage divider comprised of a resistor 136 and 138 is coupled between the positive voltage source B+ and the logic 0 reference and supplies a reference voltage to the negative input of the comparator 134 representing a predetermined low vehicle speed threshold. The output of the comparator 134 is coupled to the respective enable inputs of the gates 124 and 126 and to the logic 0 reference through a capacitor 140 and a resistor 142. The junction between the capacitor 140 and the resistor 142 is coupled to a timer 143. The output of the timer 143 is coupled to a junction 144 through a resistor 145. The junction 144 is coupled to the enable input of the gate 130 and to an INVERTER 146. The output of the INVERTER 146 is coupled to the enable input of the gate 128.

The output of the flow transducer 26 of FIG. 1 is coupled to the input of a digital-to-analog converter 148 whose output is a DC voltage having a magnitude directly related to vehicle fuel flow rate. This voltage is applied to the positive input of a comparator 150. A voltage divider comprised of a resistor 152 and a resistor 154 is coupled between the DC voltage B+ and the logic 0 reference. The voltage divider supplies a reference voltage to the negative input of the comparator 150 having a magnitude representing a predetermined fuel flow rate. The output of the comparator 150 is coupled to the input of an INVERTER 156 whose output is coupled to the junction 144 through a resistor 157.

The outputs of the gates 128 and 130 are each coupled to the clock input of a digital counter and decoder 158. The reset pulse RP is coupled to the reset input of the counter and decoder 158. The parallel outputs of the counter and decoder 158 are coupled to a digital display 160.

Each of the gates 124, 126, 128, and 140 block the input coupled thereto from its output from the signal supplied to its enable input is a logic 0. When the signal applied to its enable input is a logic 1, the digital signal applied to its input is coupled to its output.

When the vehicle speed is below the predetermined low speed threshold, the output of the digital-to-analog converter 132 is below the reference level applied to the negative input of the comparator 134. Consequently, the output of the comparator is a logic 0 which inhibits the gates 124 and 126. Consequently, their outputs and therefore the outputs of the gates 128 and 130 are continuous logic zeros so that the counter and decoder supplies an indication representing zero fuel economy to the digital display 160. When the vehicle speed exceeds the low speed threshold, the output of the digital-to-analog converter 132 exceeds the reference voltage applied to the negative input of the comparator 134 which shifts its output from a logic 0 to a logic 1. Each of the gates 124 and 126 is enabled by the logic 1 output of the comparator 134 to couple the series of pulse groups representing the instantaneous vehicle fuel economy and the average vehicle fuel economy to their respective outputs and to the respective inputs of the gates 128 and 130.

Upon the transition from a logic 0 to a logic 1 at the output of the comparator 134, a voltage pulse is generated across the resistor 142 which triggers the timer 143. After a time period determined by the time constant of the timer 143, the output thereof shifts from a logic 0 to a logic 1. During the duration of this time period, the output of the inverter 146 is a logic 1 to enable the gate 128 to couple the output of the gate 124 to the clock input of the counter and decoder 158. Also, during this time period, the gate 130 is disabled by the logic 0 applied to its enable input. The series of pulse groups representing the instantaneous vehicle fuel economy coupled to the clock input of the counter and decoder 158 during the period of the timer are counted by the counter and decoder 158 which drive the display 160 to provide an indication of the instantaneous vehicle fuel economy. After the sample pulse SP, the reset pulse RP is generated to reset the counter and decoder 158 which is then clocked by the next pulse group coupled thereto through the gate 124 and the gate 128. In this manner, the display 160 is continually updated at the frequency of the sample pulse with each pulse group representing the instantaneous vehicle fuel economy. The duration of the timer 144 is selected to represent the anticipated acceleration time of the vehicle after the vehicle has attained the low speed threshold. This enables the vehicle operator to observe the instantaneous vehicle fuel economy during the acceleration period.

After the time period of the timer 144, its output shifts from the logic 0 to a logic 1 to enable the gate 130 and to disable the gate 128. Thereafter, the gate 130 couples the output of the gate 126 to the clock input of the counter 158. Therefore, the series of pulse groups representing average vehicle fuel economy is coupled to the clock input of the counter 158 which drives the display 160 to provide an indication of the average vehicle fuel economy.

During operation of the vehicle, when the fuel flow rate exceeds the reference predetermined fuel flow rate determined by the voltage divider 152 and 154, the output of the INVERTER 156 shifts to a logic 0 to disable the gate 130 and to enable the gate 128 to pass the pulse groups representing the instantaneous vehicle fuel economy to the clock input of the counter 158 which drives the display 160 to indicate the instantaneous vehicle fuel economy.

As can be seen from the foregoing, when the vehicle speed is below the threshold level, the display 160 provides an indication of zero fuel economy and when the vehicle speed is above the threshold level, the display 160 displays the instantaneous vehicle fuel economy during the predetermined time period after the vehicle reaches the threshold velocity or if the vehicle fuel consumption exceeds the predetermined rate. At all other times, the average fuel economy is displayed.

Since the repetition rate of the clock pulses CLK is very high relative to the frequency of the output from the divider 12 of FIG. 1, the time period between sample pulses SP is negligible relative to the time period of the sample pulse SP which may be, for example, 1 second. Therefore, the display of vehicle fuel economy is updated at the repetition rate of the sample pulse SP which is independent of the vehicle speed or fuel flow rate.

The detailed description of the preferred embodiment of this invention for the purposes of explaining the principles thereof is not to be considered as limiting or restricting the invention since many modifications may be made by the exercise of skill in the art without departing from the scope of the invention.

I claim:

1. A vehicle fuel economy calculator comprising: a flow transducer for generating fuel flow pulses having a frequency proportional to vehicle fuel flow rate; a speed transducer for generating speed pulses having a frequency proportional to vehicle speed; means responsive to the fuel flow pulses and the speed pulses for generating a first series of pulse groups, the number of pulses in each pulse group in the first series representing the instantaneous vehicle fuel economy; a plurality of digital up/down counters, each of the counters having data inputs and data outputs and being presettable to a digital number applied to its data inputs; a plurality of memory circuits, the number of memory circuits being one less than the number of up/down counters; means coupling each memory circuit between the data inputs and outputs of a respective pair of up/down counters to form a series of up/down counters interconnected by the memory circuits; a divider for dividing the number of pulses coupled thereto by the number of up/down counters and supplying a number of pulses equal to the quotient; means for coupling the first series of pulse groups to the divider, the divider supplying a second series of pulse groups, the number of pulses in each pulse group in the second series representing the instantaneous vehicle fuel economy divided by the first number; means for counting up the first up/down counter in the series of up/down counters with the pulses in the second series of pulse groups to generate a digital number representing the number of pulses counted; and means after each pulse group in the second series for sequentially enabling each memory circuit to memorize the digital number at the up/down counter data outputs coupled therewith and to apply the memorized digital number to the up/down counter data inputs coupled therewith, totalizing the digital numbers in the up/down counters, and presetting each of the up/down counters to the digital number applied to the data inputs thereof, the means for totalizing the digital numbers in the up/down counters including means for counting down each of the up/down counters to zero in succession, whereby the totalized digital numbers represents an average vehicle fuel economy.

2. A vehicle fuel economy calculator and indicator comprising; a flow transducer for generating fuel flow pulses having a frequency proportional to vehicle fuel flow rate; a speed transducer for generating speed pulses having a frequency proportional to vehicle speed; a pulse generator for generating repeated sample pulses; means for totalizing the number of fuel flow pulses during each sample pulse and supplying a digital number representing the totalized number of fuel flow pulses; means for totalizing the number of speed pulses during each sample pulse; means coupled to the last mentioned means for generating a pulse group after each sample pulse to form a first series of pulse groups, the number of pulses in each pulse group in the first series being equal to the totalized number of speed pulses in the previous sample pulse; a first programmable divider having divisor and dividend inputs, the first programmable divider being effective to divide a number of pulses applied to its dividend input by a digital number applied to its divisor input and supply a number of pulses equal to the quotient; means coupling the digital number representing the totalized number of fuel flow pulses to the divisor input of the first programmable divider; means for coupling the first series of pulse groups to the dividend input of the first programmable divider, the first programmable divider supplying a second series of pulse groups, the number of pulses in each pulse group of the second series representing the instantaneous vehicle fuel economy; a plurality of digital up/down counters, each of the up/down counters having data inputs and data outputs and being presettable to a digital number applied to its data inputs; a plurality of memory circuits, the number of memory circuits being one less than the number of up/down counters; means coupling each memory circuit between the data inputs and outputs of a respective pair of up/down counters to form a series of up/down counters interconnected by the memory circuits; a second divider for dividing the number of pulses coupled thereto by the number of up/down counters and supplying a number of pulses equal to the quotient; means for coupling the second series of pulse groups to the second divider, the second divider supplying a third series of pulse groups, the number of pulses in each pulse group in the third series representing the instantaneous vehicle fuel economy divided by the number of up/down counters; means for counting up the first up/down counter in the series of up/down counters with the pulses in the third series of pulse groups to generate a digital number at the data outputs of the first up/down counter representing the number of pulses counted; means after each pulse group in the third series for sequentially enabling each memory circuit to memorize the digital number at the up/down counter data outputs coupled therewith and to apply the memorized digital number to the up/down counter data inputs coupled therewith, totalizing the digital numbers in the up/down counters, and presetting each of the up/down counters to the digital number applied to the data inputs thereof, the means for totalizing the digital numbers in the up/down counters including means for counting down each of the up/down counters to zero in succession to generate a fourth series of pulse groups, the number of pulses in each pulse group in the fourth series being equal to the totalized digital numbers and representing an average vehicle fuel economy; a digital indicator; and means for selectively coupling the second and fourth series of pulse groups to the digital indicator to selectively display instantaneous or average vehicle fuel economy.

3. A vehicle fuel economy calculator and indicator comprising: a flow transducer for generating fuel flow pulses having a frequency proportional to vehicle fuel flow rate; a speed transducer for generating speed pulses having a frequency proportional to vehicle speed; a pulse generator for generating repeated sample pulses; means for totalizing the number of fuel flow pulses during each sample pulse and supplying a digital number representing the totalized number of fuel flow pulses; means for totalizing the number of speed pulses during each sample pulse; means coupled to the last mentioned means for generating a pulse group after each sample pulse to form a first series of pulse groups, the number of pulses in each pulse group in the first series being equal to the totalized number of speed pulses in the previous sample pulse; a first programmable divider having divisor and dividend inputs, the first programmable divider being effective to divide a number of pulses applied to its dividend input by a digital number applied to its divisor input and supply a number of pulses equal to the quotient; means coupling the digital number representing the totalized number of fuel flow pulses to the divisor input of the first programmable divider; means for coupling the first series of pulse groups to the dividend input of the first programmable divider, the first programmable divider supplying a second series of pulse groups, the number of pulses in each pulse group of the second series representing the instantaneous vehicle fuel economy; a plurality of digital up/down counters, each of the up/down counters having data inputs and data outputs and being presettable to a digital number applied to its data inputs; a plurality of memory circuits, the number of memory circuits being one less than the number of up/down counters; means coupling each memory circuit between the data inputs and outputs of a respective pair of up/down counters to form a series of up/down counters interconnected by the memory circuits; a second divider for dividing the number of pulses coupled thereto by the number of up/down counters and supplying a number of pulses equal to the quotient; means for coupling the second series of pulse groups to the second divider, the second divider supplying a third series of pulse groups, the number of pulses in each pulse group in the third series representing the instantaneous vehicle fuel economy divided by the number of up/down counters; means for counting up the first up/down counter in the series of up/down counters with the pulses in the third series of pulse groups to generate a digital number at the data outputs of the first up/down counter representing the number of pulses counted; means after each pulse group in the third series for sequentially enabling each memory circuit to memorize the digital number at the up/down counter data outputs coupled therewith and to apply the memorized digital number to the up/down counter data inputs coupled therewith, totalizing the digital numbers in the up/down counters, and presetting each of the up/down counters to the digital number applied to the data inputs thereof, the means for totalizing the digital numbers in the up/down counters including means for counting down each of the up/down counters to zero in succession to generate a fourth series of pulse groups, the number of pulses in each pulse group in the fourth series being equal to the totalized digital numbers and representing an average vehicle fuel economy; a digital indicator; first gate means responsive to the speed pulses and the fuel flow pulses for coupling the second series of pulse groups to the digital indicator during a predetermined time period after the vehicle speed exceeds a speed threshold or when the fuel flow rate exceeds a fuel flow threshold; and second gate means responsive to the speed pulses and the fuel flow pulses for coupling the fourth series of pulse groups to the digital indicator when the fuel flow rate is below the fuel flow threshold following the expiration of the predetermined time period after the vehicle speed exceeds the speed threshold, whereby instantaneous and average vehicle fuel economy are selectively displayed as a function of vehicle speed and fuel flow rate.

* * * * *

UNITED STATES PATENT AND TRADEMARK OFFICE
CERTIFICATE OF CORRECTION

PATENT NO. : 3,967,097
DATED : June 29, 1976
INVENTOR(S) : John A. Moretti

It is certified that error appears in the above-identified patent and that said Letters Patent are hereby corrected as shown below:

Column 3, line 5, "SP" (second occurrence) should read -- $\overline{SP}$ --.

Column 3, line 9, "$\overline{SP}$" should read -- SP --.

Column 3, line 47, "plate" should read -- place --.

Column 4, line 11, "sample" should read -- same --.

Column 6, line 8, "fruther" should read -- further --.

Column 7, line 5, "92" should read -- 82 --.

Column 7, line 22, "pusles" should read -- pulses --.

Signed and Sealed this

Twenty-first Day of September 1976

[SEAL]

Attest:

RUTH C. MASON
*Attesting Officer*

C. MARSHALL DANN
*Commissioner of Patents and Trademarks*